US008754853B2

(12) United States Patent
Helton

(10) Patent No.: US 8,754,853 B2
(45) Date of Patent: Jun. 17, 2014

(54) HAND-INTERFACE FOR WEAPON STATION

(75) Inventor: Justin R. Helton, Fredericksburg, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 807 days.

(21) Appl. No.: 12/925,393

(22) Filed: Sep. 29, 2010

(65) Prior Publication Data

US 2012/0313853 A1 Dec. 13, 2012

(51) Int. Cl.
*G06F 3/0338* (2013.01)

(52) U.S. Cl.
USPC ........... 345/161; 345/156; 345/157; 345/167; 89/1.815; 74/471 XY; 463/38

(58) Field of Classification Search
USPC .............. 345/156–161, 163, 167; 463/36–38; 89/1.815, 1.812, 125, 142, 27, 11, 28, 89/1, 2, 37, 27.11, 28.1, 28.2, 37.01; 74/471 XY
See application file for complete search history.

(56) References Cited

U.S. PATENT DOCUMENTS

| | | | | | |
|---|---|---|---|---|---|
| 2,140,946 | A | * | 12/1938 | Swartz | 89/148 |
| 3,055,180 | A | * | 9/1962 | Kane | 60/390 |
| 3,365,560 | A | * | 1/1968 | Lee | 200/332.2 |
| 3,528,320 | A | * | 9/1970 | Maniker et al. | 74/625 |
| 4,361,071 | A | * | 11/1982 | Carlson et al. | 89/1.815 |
| 4,419,079 | A | * | 12/1983 | Georges et al. | 434/43 |
| 4,552,360 | A | * | 11/1985 | Bromley et al. | 463/38 |
| 4,857,922 | A | * | 8/1989 | Miller et al. | 340/968 |
| 5,175,534 | A | * | 12/1992 | Thatcher | 345/156 |
| 5,512,892 | A | * | 4/1996 | Corballis et al. | 341/22 |
| 5,982,356 | A | * | 11/1999 | Akiyama | 345/161 |
| 6,184,862 | B1 | * | 2/2001 | Leiper | 345/156 |
| 6,287,198 | B1 | | 9/2001 | McCauley | 463/37 |
| 6,304,840 | B1 | * | 10/2001 | Vance et al. | 703/21 |
| 6,512,511 | B2 | * | 1/2003 | Willner et al. | 345/169 |
| 6,816,151 | B2 | | 11/2004 | Dellinger | 345/167 |
| 7,176,893 | B1 | * | 2/2007 | Larkin | 345/161 |
| 7,651,029 | B1 | * | 1/2010 | Mangaroo et al. | 235/462.45 |
| 8,550,915 | B2 | * | 10/2013 | Ashida et al. | 463/37 |
| 2002/0003188 | A1 | * | 1/2002 | Moshier | 244/4 R |
| 2005/0099389 | A1 | * | 5/2005 | Ma et al. | 345/158 |
| 2005/0099390 | A1 | * | 5/2005 | Ma et al. | 345/158 |
| 2005/0116926 | A1 | * | 6/2005 | Ma et al. | 345/156 |
| 2005/0148389 | A1 | * | 7/2005 | Ma et al. | 463/37 |
| 2005/0156889 | A1 | * | 7/2005 | Ma et al. | 345/163 |
| 2005/0275625 | A1 | * | 12/2005 | Koenig | 345/156 |
| 2007/0066394 | A1 | * | 3/2007 | Ikeda et al. | 463/37 |

(Continued)

*Primary Examiner* — Lun-Yi Lao
*Assistant Examiner* — Kelly B Hegarty
(74) *Attorney, Agent, or Firm* — Gerard W Thielman

(57) ABSTRACT

An ergonomic control instrument for an operator's hand is provided to be disposable on a platform and communicate with a processor. The instrument includes a base for mounting to the platform, a pistol-grip handle disposed on the base to tilt from perpendicular to the platform, a head unit disposed on the handle, a deck within the head unit connecting to the handle, and a plurality of input devices disposed on at least one of the head unit and the handle, each device of the plurality for receiving a command from the operator's hand. Also, an ergonomic control station for an operator is provided, with the station including a platform in front of the operator, a first hand-held instrument mountable to the platform, a second hand-held instrument mountable to the platform, and a processor having a plurality of connections to the first and second pluralities of input devices.

11 Claims, 12 Drawing Sheets

(56) References Cited

U.S. PATENT DOCUMENTS

| | | | | |
|---|---|---|---|---|
| 2010/0045859 | A1 * | 2/2010 | Starr et al. | 348/447 |
| 2010/0087252 | A1 * | 4/2010 | Tan et al. | 463/37 |
| 2010/0267454 | A1 * | 10/2010 | Navid | 463/37 |
| 2011/0105231 | A1 * | 5/2011 | Ambinder et al. | 463/38 |
| 2011/0165944 | A1 * | 7/2011 | Navid | 463/37 |
| 2011/0225524 | A1 * | 9/2011 | Cifra | 715/763 |
| 2013/0225288 | A1 * | 8/2013 | Levin et al. | 463/31 |

* cited by examiner 1400
564
1410
1415
1420

1300
562
1310
1315
1320

1500
660
1510
1520
1520
662
663
661
1530

HAND-INTERFACE FOR WEAPON STATION

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to hand-held control instruments and control stations. In particular, the invention relates to ergonomic and modular instruments that can be configured for sundry operations while reducing operator fatigue.

Gun operators in military training or combat situations operate individual consoles to actuate their weapons from a control station. Conventional such stations must be custom configured for particular missions. Additionally, attention demands for a variety of parameters to be controlled, along with non-optimal physiognomic configuration, can induce operator fatigue.

SUMMARY

Conventional hand-held control instruments and associated control stations yield disadvantages addressed by various exemplary embodiments of the present invention. In particular, various exemplary embodiments provide an ergonomic control instrument for an operator's hand to be disposable on a platform and communicate with a processor. The instrument includes a base for mounting to the platform, a pistol-grip handle disposed on the base to tilt from perpendicular to the platform, a head unit disposed on the handle, a deck within the head unit connecting to the handle, and a plurality of input devices disposed on at least one of the head unit and the handle, each device of the plurality for receiving a command from the operator's hand.

Additionally, various exemplary embodiments provide an ergonomic control station for an operator, with the station including a platform in front of the operator, a first hand-held instrument mountable to the platform, a second hand-held instrument mountable to the platform, and a processor having a plurality of connections to the first and second pluralities of input devices.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The configurable weapons control station benefits from (1) ergonomic disposition of hand-held instruments and associated appendage (i.e., thumb and finger) actuation, (2) component modularity for parts substitution or rearrangement, and (3) configurability to facilitate additional or alternate commands to be incorporated in the instrument in support of alternate mission scenarios. Various exemplary embodiments separately address the control station with attendant processor and the hand-held instrument that represents the controller mechanism to enable command input for the operator with reduced fatigue.

Figure 1:
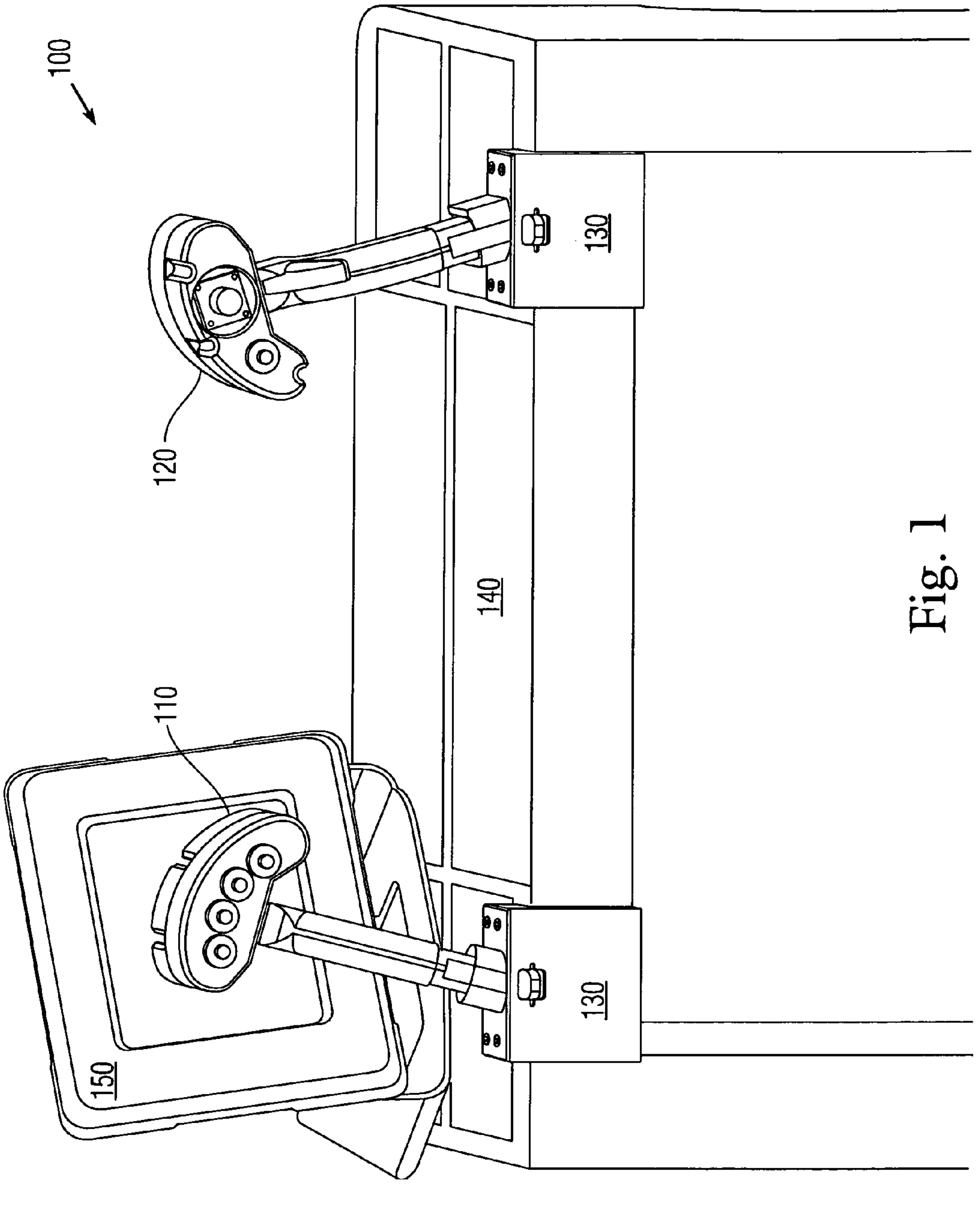
FIG. 1 is a perspective view of a first control console.

FIG. 1 shows a perspective view 100 of a first ergonomic control console. Port and starboard control instruments 110 and 120 of a first embodiment are attached by clamp fixtures 130 to a platform 140, such as a console table, which supports a touch-screen integrated personal computer (PC) and monitor 150. An operator can sit at the table 140, to hold and actuate the control instruments 110, 120 in his (or her) hands, while observing and interacting with the monitor 150 for feedback information and menu selection.

Figure 2:
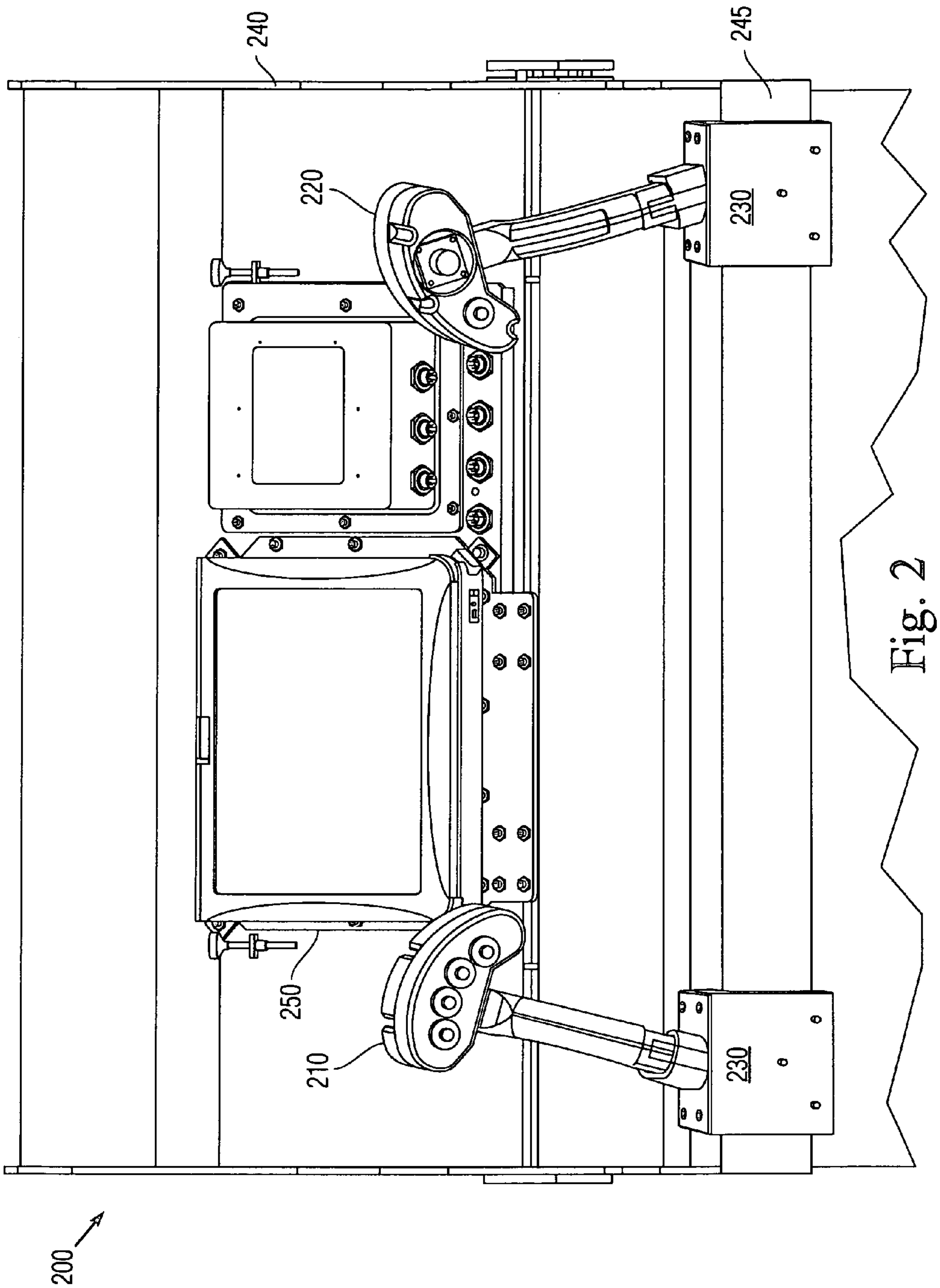
FIG. 2 is an elevation view of a second control console.

FIG. 2 shows a perspective view 200 of a second ergonomic control console developed more recently. Port and starboard control instruments 210 and 220 of a second embodiment are attached by clamp fixtures 230 to a platform 240, such as a weapons station having a ledge 245, which supports a panel-mounted personal computer (PC) and monitor 250. An operator can sit at the platform 240, to grab and actuate the control instruments 210, 220 in his (or her) hands, while observing and interacting with the monitor 250 for feedback information and menu selection.

Figure 3:
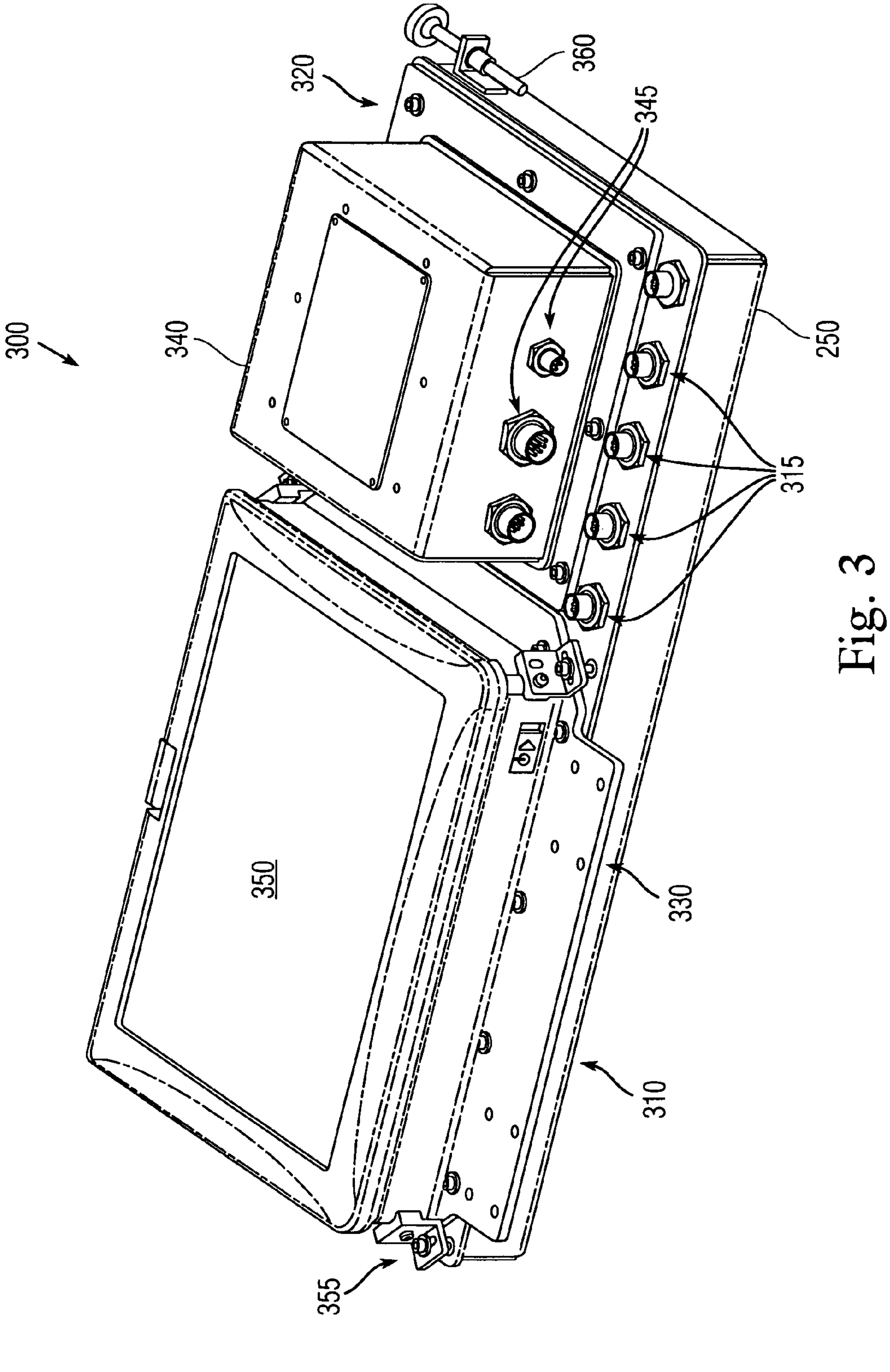
FIG. 3 is a perspective view of a computer interface assembly.

FIG. 3 shows a perspective view 300 of a computer interface 250. A metal frame 310 inserted into a work station panel and includes several coaxial connector plugs 315. A pair of flat plates 320 and 330 mounts to the frame 310. A power supply 340 with interface connector plugs 345 attaches by screws to the first plate 320. A ruggedized portable computer 350 mounts to the second plate 330 by L-shape feet 355. The frame 310 attaches to the work station panel by adjustable brackets 360.

Figure 4B:
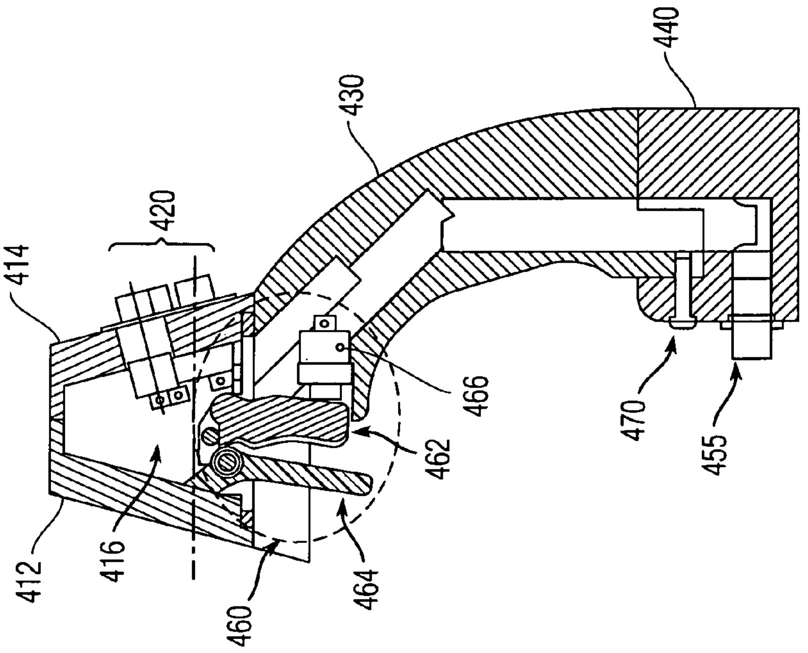
FIGS. 4A and 4B are perspective and elevation cross-section assembly views of a port instrument.
Figure 4A:
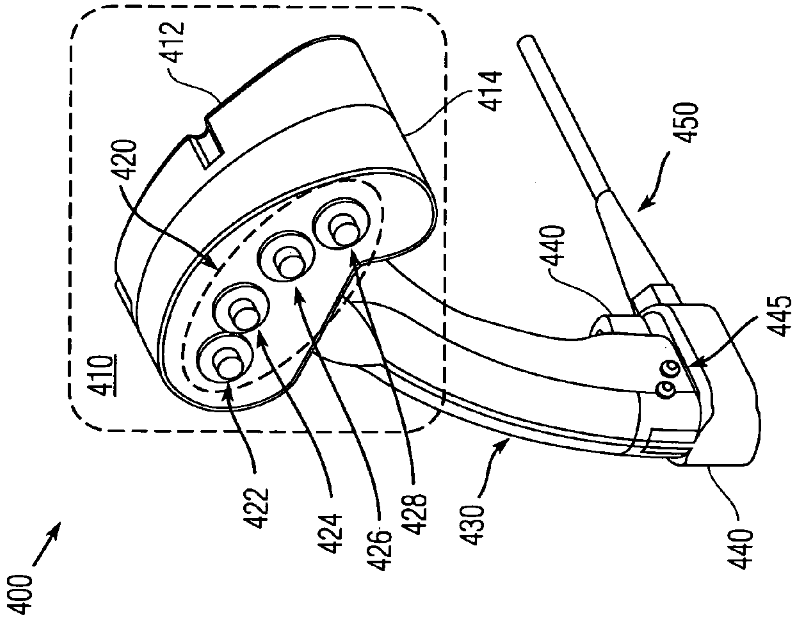

FIG. 4 shows a perspective view 400 of the port control instrument 210 (second embodiment). A port head 410 includes a fore head shell 412 and an aft head shell 414 that define an internal space 416. The aft shell 414 includes a set of four push buttons 420 to activate specific control functions by the operator's thumb. The buttons 420 encompass a region referred to as a "button space" within which a thumb may comfortably ambulate. These push buttons 420 may include toggles for: ammunition-can selection 422, rate-of-fire 424, field-of-view 426 and camera-selection 428. A port pistol-grip handle 430 supports the port head 410, and attaches to a base 440 secured by a pair of bolts 445 with accompanying nuts. A coaxial cable 450 connects to the base 440 via a coaxial connector 455.

The operator's left hand and fingers wrap around to grip the port handle 430. The port base 440 is configured to tilt the port handle 430 from perpendicular to the platform 240 towards starboard (sloping inward towards the operator's torso) to reduce operator fatigue. The operator can also operate a port trigger assembly 460 with his (or her) left forefinger. The trigger assembly 460 is suspended from the port head 410 and includes a trigger 462, a guard 464 and a pressure switch 466 within the handle 430. The base 440 attaches to the handle 430 from the fore by a screw 470.

Figure 5B:
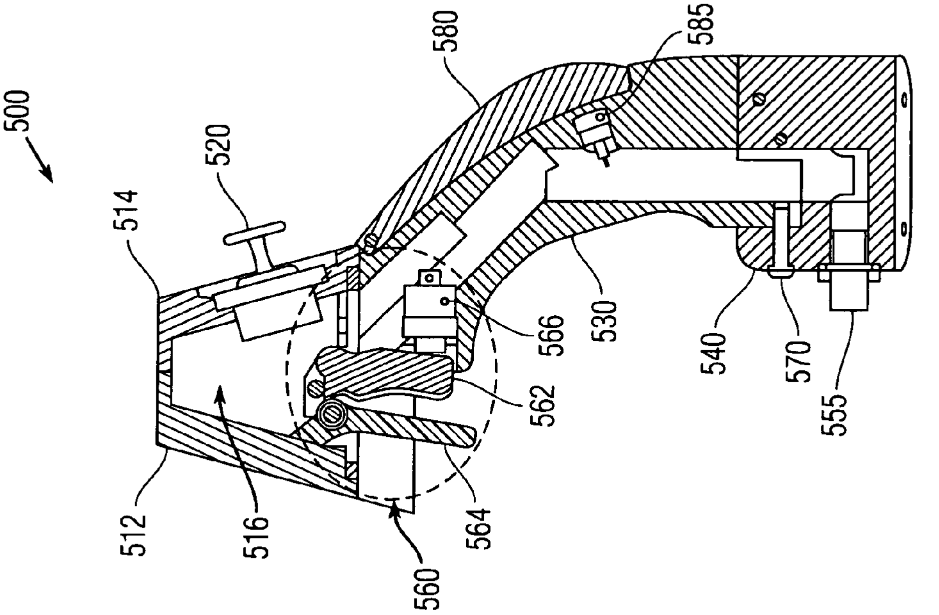
FIGS. 5A and 5B are perspective and elevation cross-section assembly views of a starboard instrument.
Figure 5A:
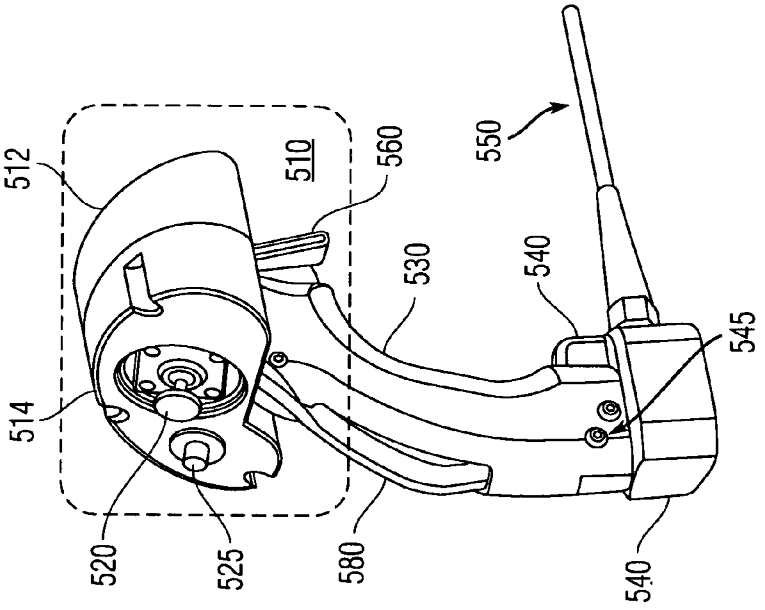

FIG. 5 shows a perspective view 500 of the starboard control instrument 220 (second embodiment). A starboard head 510 includes a fore head shell 512 and an aft head shell 514 that define an internal space 516. The aft shell 514 includes a thumb-activated joystick 520 for stewing a gun, and a slave/manual mode button 525 to toggle by the right thumb.

A starboard pistol-grip handle 530 secures an internal deck by screws to support the starboard head 510, and attaches to a base 540 secured by a pair of bolts 545 with accompanying nuts. The starboard base 540 is configured to tilt the starboard handle 530 from perpendicular to the platform 240 towards port (sloping inward towards the operator's torso) to reduce operator fatigue. A coaxial cable 550 connects to the base 540 via a coaxial connector 555.

The operator can also actuate a starboard trigger assembly 560 with the operator's right forefinger. The trigger assembly 560 is suspended from the starboard head 510 and includes a trigger 562, a guard 564 and a pressure switch 566 within the handle 530. The base 540 attaches to the handle 530 from the fore by a screw 570. The operator's right hand and fingers wrap around to grip the starboard handle 530 and pivotably secures an aft palm switch 580 to activate a pressure switch 585.

Figure 6:
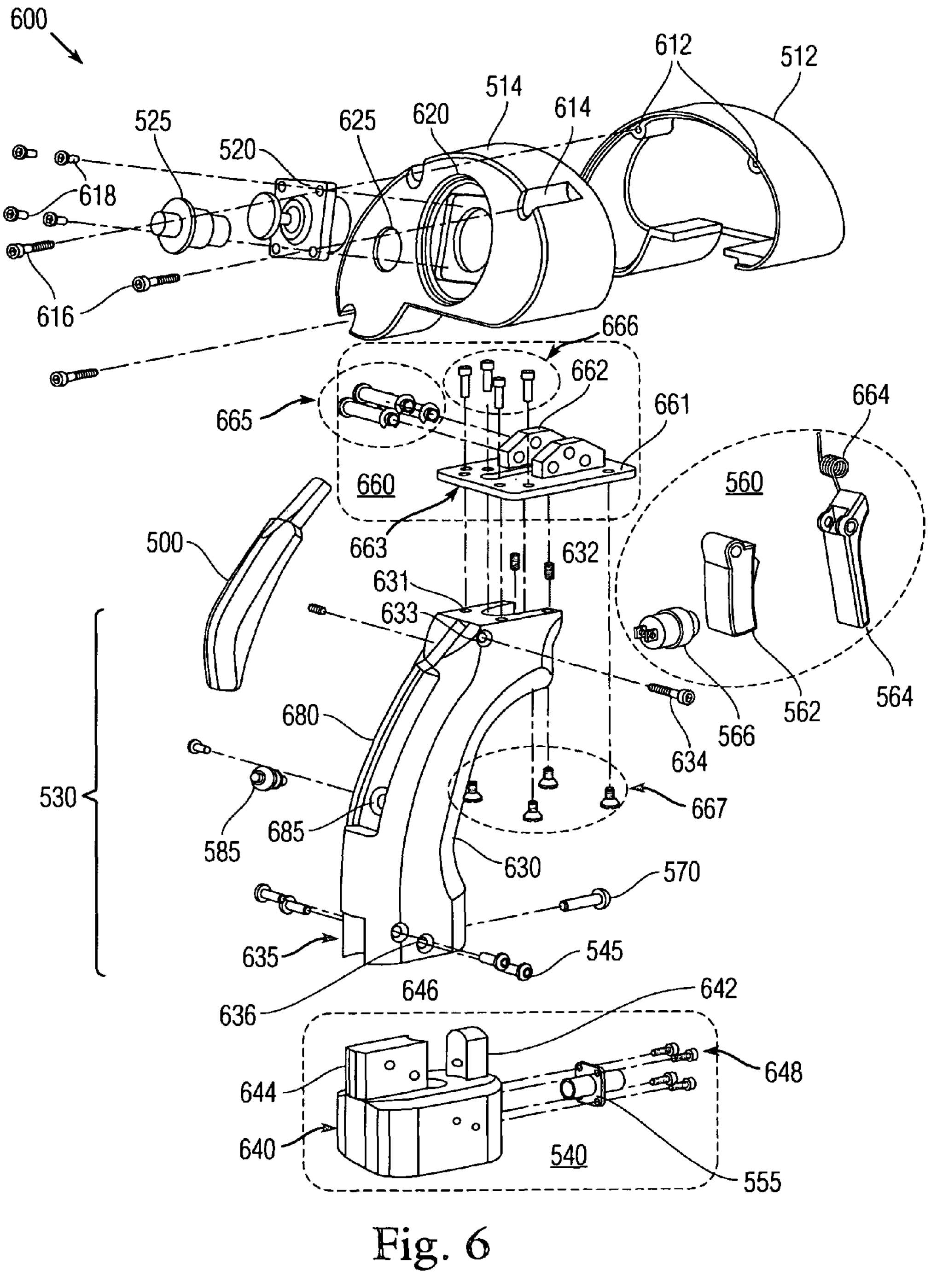
FIG. 6 is a perspective exploded view of the starboard instrument.

FIG. 6 shows a perspective exploded view 600 of the starboard instrument 220. Many of the components for the port instrument 210 are similar or substantially identical. The fore head shell 512 includes screw holes 612 coaxial with counterpart recess holes 614 in the aft head shell 514 to receive corresponding screws 616. Additional screws 618 secure the joystick 520 and button 525 into their respective cavities 620, 625 on the aft head shell 514.

The handle 530 includes a grip stock 630 having a top surface 631 with a scallop 632 for receiving the trigger assembly 560, a hole 633 for receiving a hinge screw 634, a keyslot groove 635 at the bottom with adjacent side-holes 636 for receiving the screws 545. The base 540 includes a mount 640 having a forward tongue 642 and an aft tongue 644 separated by a gap 646 for inserting a bolt. The tongues 642 and 644 fit into the groove 634 to connect the handle 530 to the base 540. Screws 648 secure the coaxial cable connector 555 into the mount 640.

An internal mounting deck 660 is disposed within the head space 516 between the head shells 512 and 514 atop the grip's top surface 631. The deck 660 includes an internal mount plate 661, a pair of beveled flanges 662 that flank a slot 663. The deck 660 permits insertion of a helical spring 664, horizontal screws 665 as well as vertical screws 666 and 667. The scallop 632 and the slot 663 enable maneuverable operation of the trigger assembly 560.

Figure 7B:
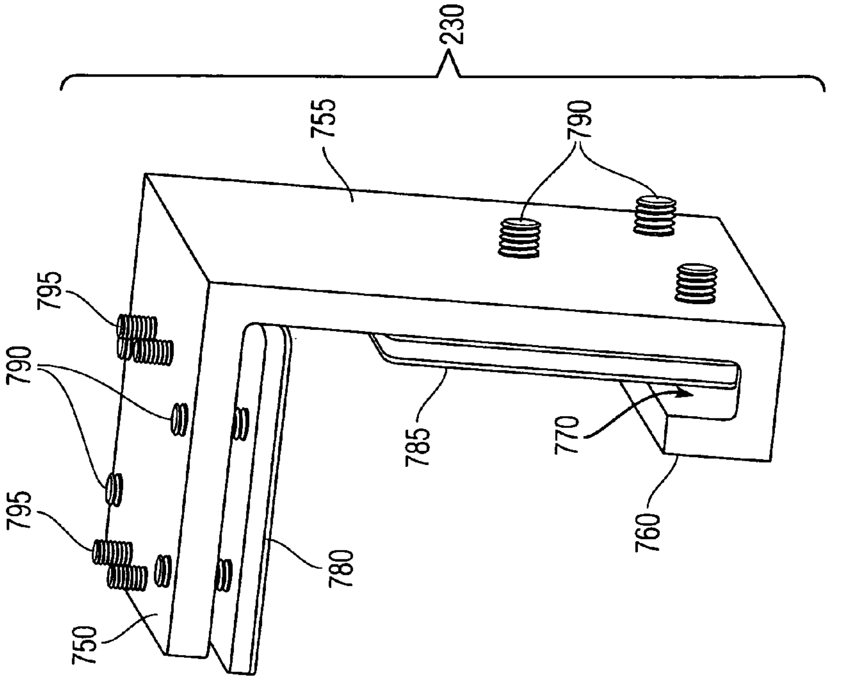
FIGS. 7A and 7B are perspective views of first and second bolt-down fixtures.
Figure 7A:
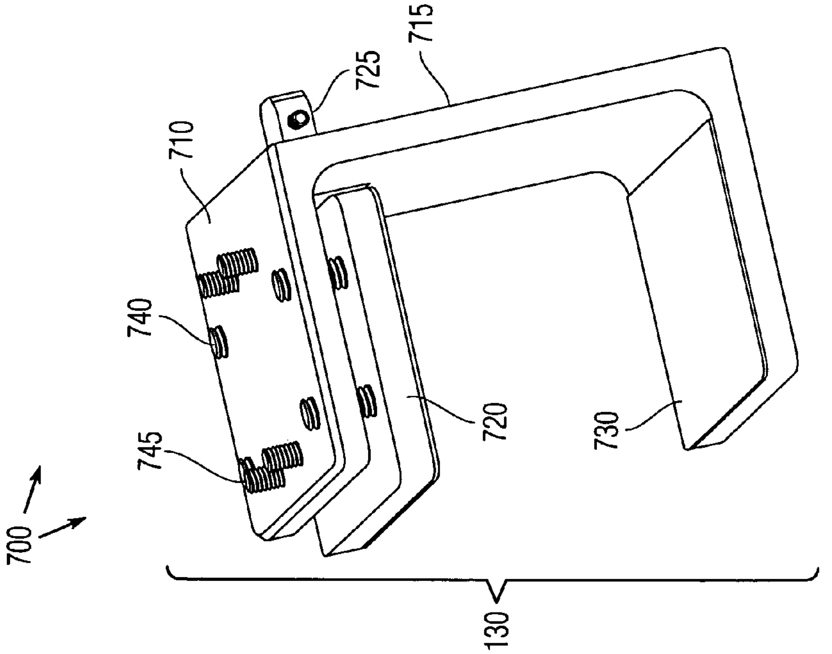

FIGS. 7A and 7B show perspective assembly views 700 of first and second bolt-down clamp fixtures 130 and 230. For the first embodiment of fixture 130, a mount flange 710 provides an upper surface on which the base 440 (port) or 540 (starboard) attaches. A leg 715 connects the mount flange 710 to a compression plate 720 secured by a tongue 725 and a lower flange 730 that faces the underside of the platform 140. The flange 710 and the plate 720 attach together by screws 740. The base 440 or 540 attach to the flange 710 by screws 745. The screws 740 enable the compression plate 720 to be tightened against the table 140 pressing against the lower flange 730.

For the second embodiment of fixture 230, a mount flange 750 provides an upper surface on which the base 440 or 540 attaches, A leg 755 connects the mount flange 750 to a lower joint 760 base that forms a channel 770. First and second clamp plates 780 and 785 are disposed to be respectively adjacent to the mount flange 750 and the leg 755, the latter within the channel 770. Screws 790 secure the plates 780 and 785 to their respective counterparts, and screws 795 attach the base 440 or 540 to the mount flange 750. The screws 790 enable the first compression plate 780 to be tightened against the platform 240 wedged against the channel 770.

Figure 8:
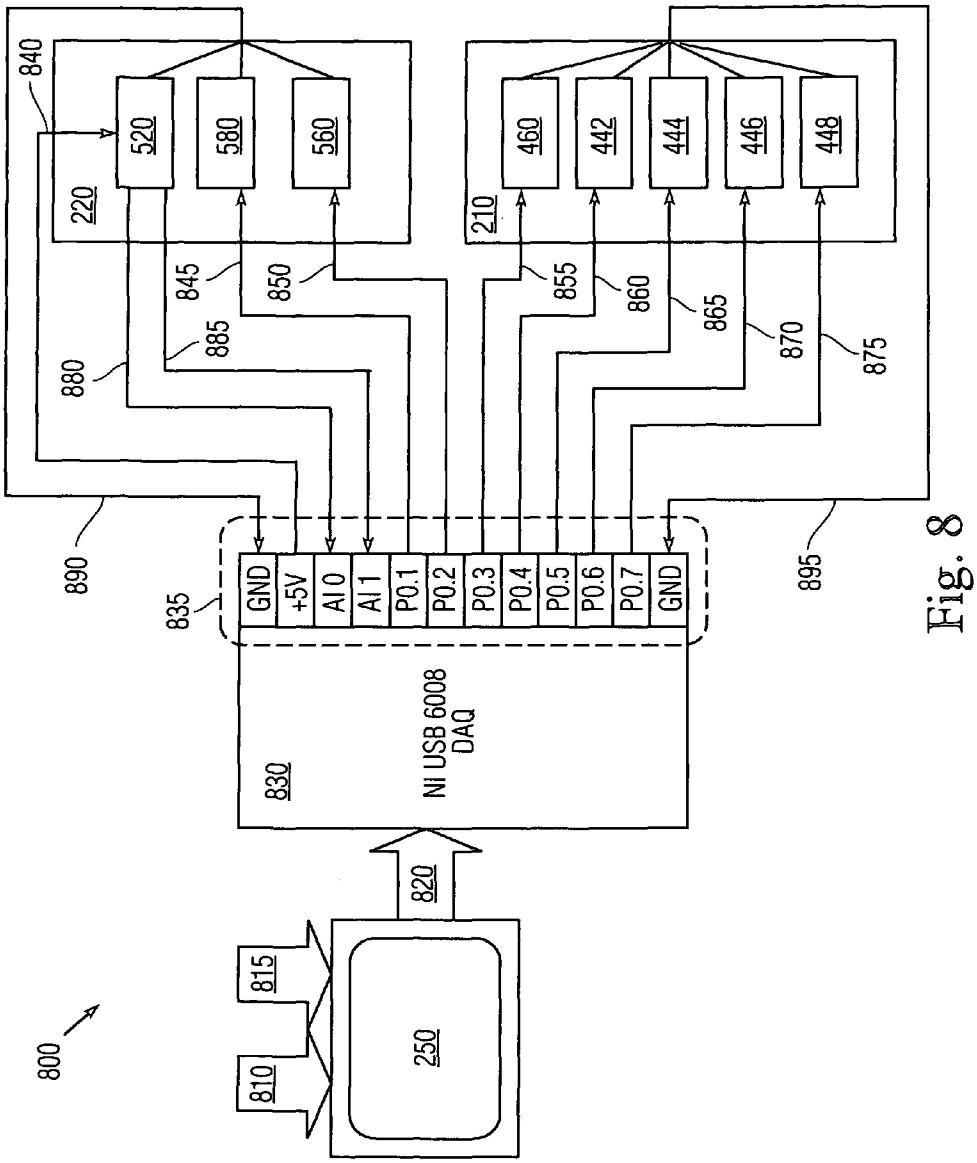
FIG. 8 is a block diagram view of a control schematic.

FIG. 8 shows a block diagram view 800 of a control schematic. The monitor 250 receives power 810 and Ethernet 815 inputs, and transmits them via a universal serial bus (USB) 820 to a NI USB 6008 processor or Data Acquisition Card (DAQ) 830 having a series of channels 835. A direct current (DC) supply voltage of $+5V_{DC}$ supplies the thumb joystick 520 in the starboard instrument 220. Safety 845 and Latch 850 commands feed respectively from the P.01 and P.02 channels to the palm switch 580 and trigger 560.

The port instrument 220 has additional inputs. Fire 855, Ammo-Can-Select Toggle 860, Rate-of-Fire Toggle 865, Field-of-View Toggle 870 and Camera-Select Toggle 875 commands feed respectively from the P0.3, P0.4, P0.5, P0.6 and P0.7 to the trigger 460, and the push buttons 420: first 422, second 424, third 426 and fourth 428. The DAQ 830 at channels AI0 and AI1 receives Elevation 880 and Azimuth 885 command signals from the joystick 520. Each of these components in their respective controls 210, 220 include connection to electrical ground (GND). The joystick 520, palm switch 580 and trigger 560 connect to ground 890 for the starboard instrument 220. The trigger 460 and push buttons 420 connect to ground 895 for the port instrument 210.

Figure 9:
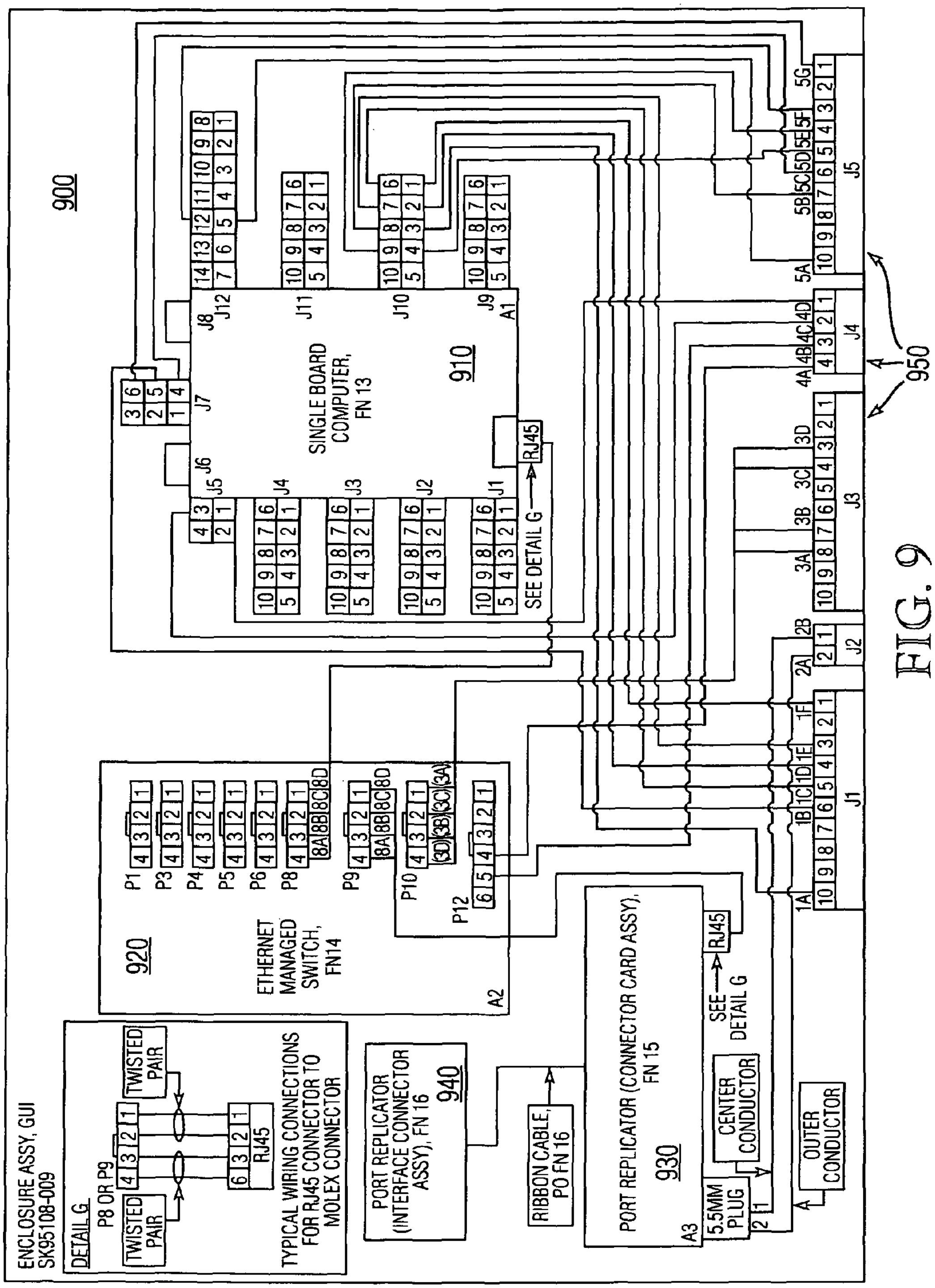
FIG. 9 is a wiring diagram of the computer interface.
Figure 10A:
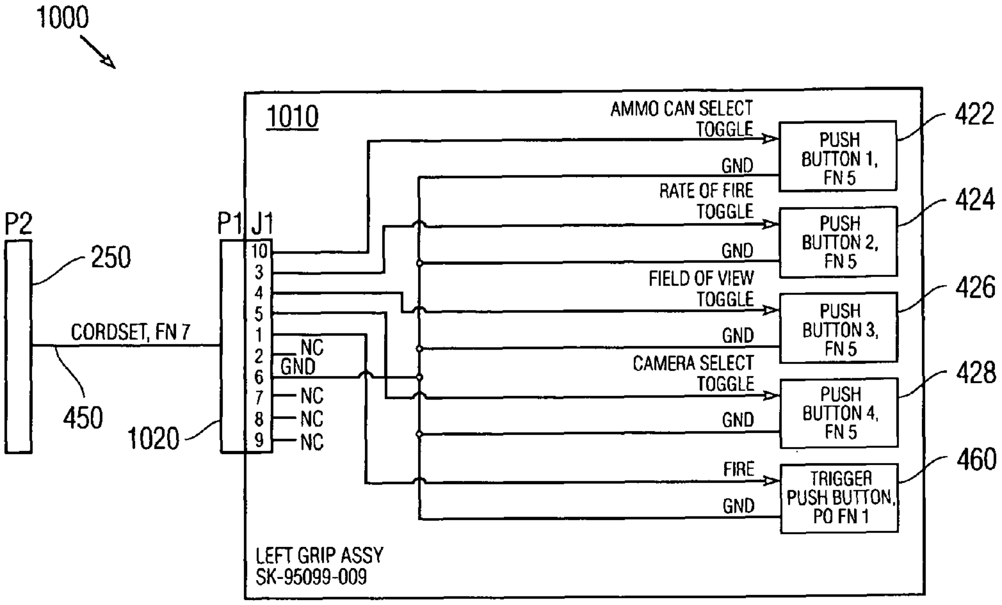
FIGS. 10A and 10B are wiring diagrams of the port and starboard control input devices.
Figure 10B:
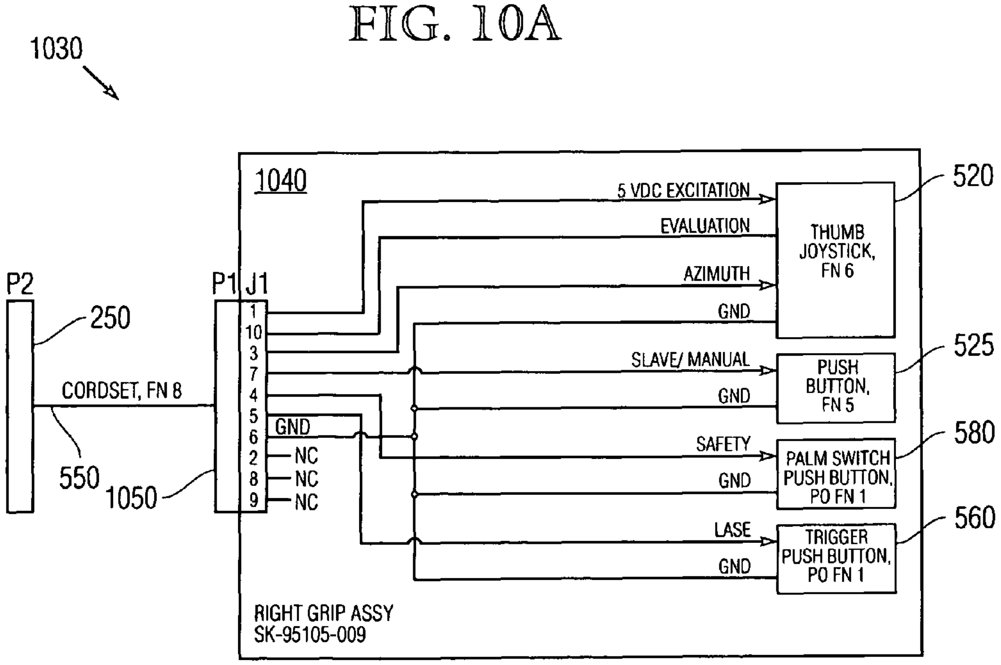

Supplemental views are provided in the subsequent images. FIG. 9 shows a wiring diagram view 900 of the computer interface 250. A single board computer 910 connects to an Ethernet switch 920 and to a connector card assembly 930 that communicates with an interface connector 940. The computer 910 connects to bus strips 950 to supply signals to auxiliary systems. FIG. 10A shows a wiring diagram view 1000 of an interface controller 1010 for the port instrument 210 to the computer 250. The buttons 422, 424, 426, 428 and the trigger 460 submit signals to a port channel junction 1020 for the computer 250 via the cable 450. FIG. 10B shows a wiring diagram view 1030 of an interface controller 1040 from the starboard instrument 220 to the computer 250. The joystick 520, button 525, trigger 560 and palm switch 580 submit signals to the starboard channel junction 1040 for the computer 250 via the cable 550.

Figure 12:
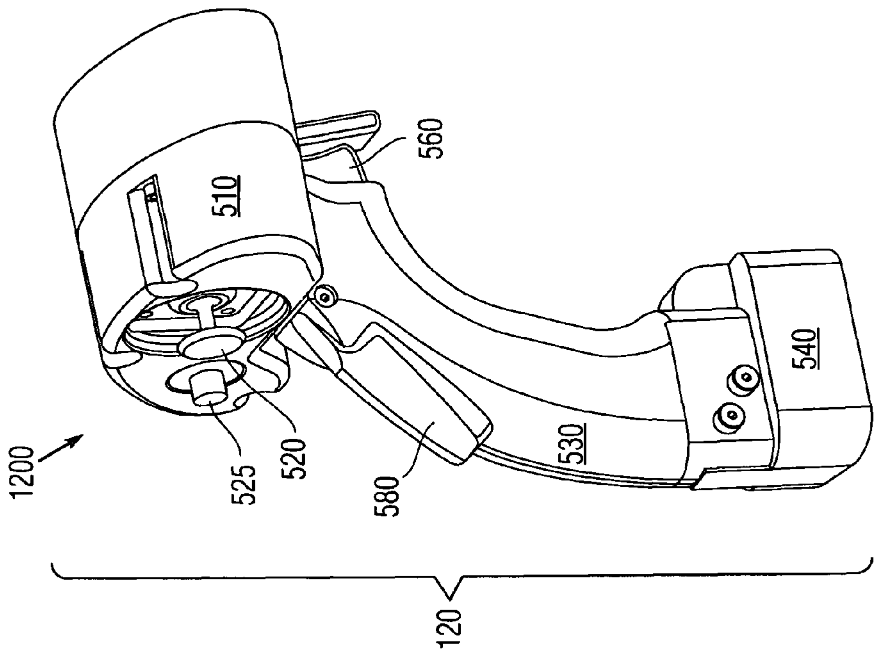
FIG. 12 is an isometric view of an alternate starboard instrument.
Figure 11:
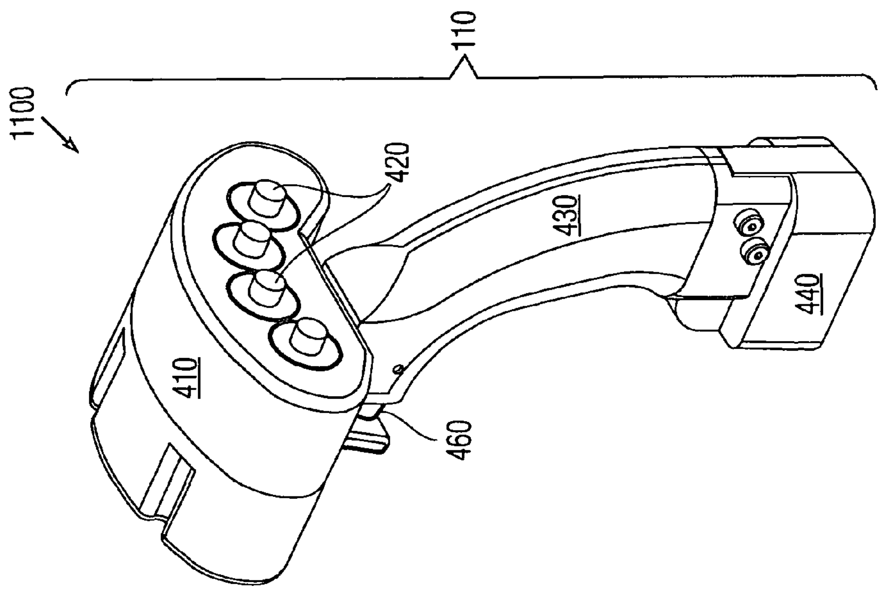
FIG. 11 is an isometric view of an alternate port instrument.

FIG. 11 an isometric view 1100 of the port instrument 110 for the first embodiment. The shells 412 and 414 for the second embodiment of the instrument 210 have fore and aft faces that slope outward from top, in contrast to the first embodiment in which the faces are vertically parallel in relation to the table 140. In this configuration, the trigger 460 protrudes from under the head assembly 410, being forward of the handle 430 that attaches on the base 440. FIG. 12 shows an isometric view 1200 of the starboard instrument 120 for the first embodiment. The shells 512 and 514 for the second embodiment of the instrument 220 have fore and aft faces that slope outward from top, in contrast to the first embodiment of the instrument 120 in which the faces are vertically parallel in relation to the table 140. The starboard instrument 120 includes the head assembly 510 with the trigger 560 protruding underneath and supported by the handle 530 that includes the palm toggle 580 and attaches to the base 540.

Figures 13, 14, 15:
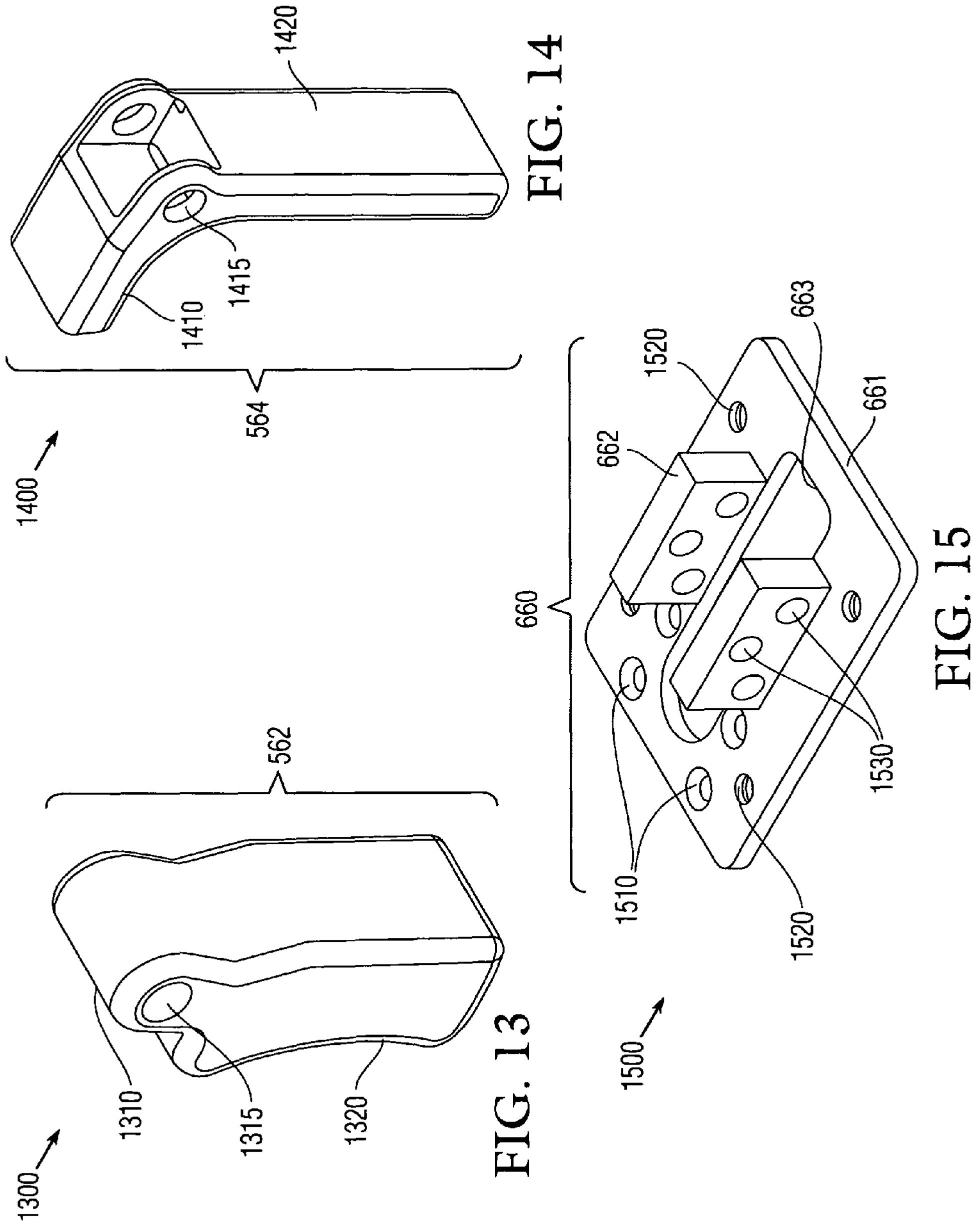
FIG. 13 is an isometric view of a trigger.
FIG. 14 is an isometric view of a trigger guard.
FIG. 15 is an isometric view of a deck.

FIG. 13 shows an isometric view 1300 of the trigger 462, 562 for either port or starboard instruments 210, 220. A latch 1310 has a lateral opening 1315 enabling one of the bolts 665 to serve as a hinge around which to pivot on the deck 660. A protrusion 1320 attaches to the latch 1310 under the heads 410, 510 that enables the operator's forefinger to pull the trigger 462, 562 for a toggle or firing command. FIG. 14 shows an isometric view 1400 of the trigger guard 464, 564 for either port or starboard instruments 210, 220. A counterbalance 1410 provides a latching surface connecting to a lateral opening 1415 under the heads 410, 510. An arm 1420 extends below the opening 1415 through which one of the bolts 665 passes to pivotably secure the guard 464, 564 to the deck 660. The spring 664 presses the guard 464, 564 to inhibit pressing of the trigger 462, 562 absent release by the operator of the guard 464, 564.

FIG. 15 shows an isometric view 1500 of the mounting deck 660. The flat plate 661 includes orifices 1510 and 1520 for securing structures together by fasteners. The larger orifices 1510 receive the fasteners 666, whereas the smaller orifices 1520 receive the smaller fasteners 667. The pair of flanges 612 is disposed flanking the slot 663. The flanges 662 also include orifices 1530 for passing the bolts 665 therethrough.

The control instruments 210, 220 in various exemplary embodiments include a commercial off-the-shelf (COTS) DAQ 830 and any number of user-input devices (buttons, knobs, joysticks) mounted in two respective "stiff stick" control grip handles 430, 530, along with the monitor 250. The DAQ 830 connects to the monitor 250 via the USB interface 815, as well as supplied drivers. The buttons 420 and 525 receive their power from and transmit inputs to the DAQ 830. These signals can then be interpreted by the monitor 250 containing software to read the DAQ 830.

The information gathered from the DAQ 830 can then be used to control other devices. The control instruments 210, 220 each feature a respective pistol-grip handle 430, 530, a "button space" that corresponds to the workspace of the human thumb, as well as an inward slope and a backside palm switch 580, both of which are designed to reduce fatigue. These control instruments 210, 220 are designed to be produced, for example, by either machining or casting, and enable right-handed or left-handed bias pistol-grips 430, 530 to be produced from similar parts, including the grip stock 630.

The advantages of this system include ease of reconfiguration and modularity. Physically, a new operator input device can be inserted merely by cutting an additional hole in the face of the grip head 410, 510 and extending extra wires to the DAQ 830. The inward slope of pistol-grip handles 430, 530, as well as the positions of the buttons 420 and 525, the thumb joystick 520, the backside palm switch 580, also reduce operator fatigue and strain. The high level of mechanical division also allows for rapid reconfiguration of buttons 420 (or arrangement of "button space") on the head 410.

There exist various conventional COTS user input instruments. Typically, these conventional instruments do not easily facilitate reconfiguration. Such designs that can be reconfigurable are usually limited to certain device types in specified conditions or environments. The various exemplary embodiments described herein obviate these limitations with modular ergonomic features.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. An ergonomic control station for an operator having left and right hands, said station comprising:

a platform in front of the operator;

a first port hand-held instrument including:

a first base for mounting to said platform;

a first pistol-grip handle disposed on said first base to tilt in a first lateral direction from perpendicular to said platform;

a first head unit disposed on said first handle;

a first deck within said first head unit connecting to said first handle; and a first plurality of input devices disposed on at least one of said first head unit and said first handle, each device of said first plurality for receiving a first command from the operator's left hand, said each device of said first plurality being selected from a first set of modular components;

a second starboard hand-held instrument including:

a second base for mounting to said platform;

a second pistol-grip handle disposed on said second base to tilt in a second lateral direction from perpendicular to said platform;

a second head unit disposed on said second handle;

a second deck within said second head unit connecting to said second handle; and a second plurality of input devices disposed on at least one of said second head unit and said second handle, each device of said second plurality for receiving a second command from the operator's right hand, said each device of said second plurality being selected from a second set of said modular components, wherein said first and second sets are configured to be interchangeable, to operate distinguishable functions, and have distinguishable device types based on ergonomic actuation, said types including thumb push, finger pull and palm press; and a processor having a plurality of connections that correspond to said first and second pluralities of input devices.

2. The station according to claim 1, wherein:

said first instrument is configured for an operator's left hand with said first set of input devices including said thumb push type, said first lateral direction tilts to starboard, said second instrument is configured for an operator's right hand with said second set of input devices including at least one of said finger pull and said palm press types, and said second lateral direction tilts to port.

3. The station according to claim 1, wherein said processor includes a data acquisition card having a plurality of receive and transmit channels.

4. The station according to claim 3, wherein:

one of said first and second pluralities of input devices is a thumb joystick, said channels further include a direct current supply voltage transmitted to said thumb joystick, an elevation command signal received from said thumb joystick, and an azimuth command signal received from said thumb joystick.

5. The station according to claim 3, wherein:

one of said first and second pluralities of input devices is a palm actuated switch, and said channels further include a safety command received from said palm actuated switch.

6. The station according to claim 3, wherein:

a first input device of said first plurality of input devices is a first trigger, a second input device of said second plurality of input devices is a second trigger, and said channels further include a latch command received from said first trigger and a fire command received from said second trigger.

7. The station according to claim 3, wherein:

one of said first and second pluralities of input devices is a button, and said channels further include at least one of:

an ammunition-select toggle, a rate-of-fire toggle, a field-of-view toggle, and a camera-select toggle, that is received from said button.

8. The station according to claim 3, wherein said channels communicate signals to said first and second plurality of input devices across a universal serial bus.

9. The station according to claim 1, wherein said processor is incorporated in a touch-screen monitor.

10. The station according to claim 1, wherein said processor is incorporated in a portable computer.

11. The station according to claim 1, further comprising:

a first fixture for detachably mounting said first base to said platform; and a second fixture for detachably mounting said second base to said platform.

* * * * *